US012433814B2

(12) United States Patent
Lunter et al.

(10) Patent No.: US 12,433,814 B2
(45) Date of Patent: Oct. 7, 2025

(54) APPARATUS FOR DRY HYDRO-THERAPY BODY MASSAGE IN A RECLINED POSITION

(71) Applicant: JTL Enterprises, Inc., Clearwater, FL (US)

(72) Inventors: Paul Lunter, Palm Harbor, FL (US); Timothy Elliott, Pinellas Park, FL (US); Mario Simoes, Pinellas Park, FL (US); William Daskam, Palm Harbor, FL (US); Matthew Emenheiser, St Petersburg, FL (US)

(73) Assignee: JTL Enterprises, Inc., Clearwater, FL (US)

( * ) Notice: Subject to any disclaimer, the term of this patent is extended or adjusted under 35 U.S.C. 154(b) by 811 days.

(21) Appl. No.: 16/800,490

(22) Filed: Feb. 25, 2020

(65) Prior Publication Data

US 2020/0276076 A1 Sep. 3, 2020

Related U.S. Application Data

(60) Provisional application No. 62/811,928, filed on Feb. 28, 2019.

(51) Int. Cl.
*A61H 9/00* (2006.01)

(52) U.S. Cl.
CPC ... *A61H 9/0021* (2013.01); *A61H 2009/0042* (2013.01); *A61H 2201/0149* (2013.01); *A61H 2201/1642* (2013.01)

(58) Field of Classification Search
CPC .......... A61H 9/0021; A61H 2009/0042; A61H 2201/0149; A61H 2201/1642;

(Continued)

(56) References Cited

U.S. PATENT DOCUMENTS 3,595,223 A 7/1971 Castagna
4,498,205 A * 2/1985 Hino .................. A61G 7/05746 24/72.5

(Continued)

FOREIGN PATENT DOCUMENTS

CN 2362362 Y 2/2000
CN 105877946 A * 8/2016

(Continued)

OTHER PUBLICATIONS

International Search Report and Written Opinion issued in International PCT Appl. Serial No. PCT/US20/19909, mailed Jun. 8, 2020, all enclosed pages cited.

(Continued)

*Primary Examiner* — Justine R Yu
*Assistant Examiner* — Matthew R Moon
(74) *Attorney, Agent, or Firm* — Nelson Mullins Riley & Scarborough LLP

(57) ABSTRACT

An apparatus for dry hydro-therapy body massage of a user in a reclined position, including a housing structure having a user support surface for supporting the user in a seated position, the user support surface including a seat back portion, a seat portion with a semi-cylindrical main seat section and a leg seat section, wherein the seat back portion and the leg seat section are in relative angular relation to each other and the main seat section is disposed therebetween, and a fluid spray assembly interiorly within the housing structure for directing a fluid stream at the user support surface for imparting a massaging effect through the support surface to the upper body portion and lower body portion of the user.

20 Claims, 16 Drawing Sheets

(58) Field of Classification Search

CPC .... A61H 2201/0207; A61H 2201/0214; A61H 2201/0264; A61H 2201/1215; A61H 2201/1409; A61H 2201/1623; A61H 2201/1645; A61H 2201/169; A61H 2203/045; A61H 2205/062; A61H 2205/088; A61H 2201/0111; A61H 2201/1654; A61H 2201/1669; A61H 2201/5066; A61H 2205/04; A61H 2205/08; A61H 2205/081; A61H 2205/084; A61H 2205/10; A61H 1/00; A61H 33/10; A61H 2033/068; A61H 2201/0221; A61H 2201/1207; A61H 2201/1633; A61H 2201/5058; A61H 2203/0443; A61G 7/057; A61G 7/05746; A61G 7/05753; A61G 7/05761; A61G 7/05769; A61G 7/05776; A47C 27/084; A47G 9/1027

USPC .......................................................... 5/655.3

See application file for complete search history.

(56) References Cited

U.S. PATENT DOCUMENTS

| | | | | | |
|---|---|---|---|---|---|
| 4,635,620 | A | | 1/1987 | Ricchio | |
| 4,751,919 | A | | 6/1988 | Thomsen | |
| 4,757,808 | A | | 7/1988 | Effler, Jr. | |
| 4,908,016 | A | | 3/1990 | Thomsen | |
| 4,976,256 | A | * | 12/1990 | Marlin | A61H 9/0021 601/55 |
| 5,074,286 | A | | 12/1991 | Gillaspie et al. | |
| 5,387,181 | A | * | 2/1995 | Olsen | A47C 7/74 5/284 |
| 5,713,834 | A | * | 2/1998 | Palmer | A61H 23/04 601/149 |
| 6,036,663 | A | | 3/2000 | Arzt | |
| 6,139,512 | A | | 10/2000 | Ricchio | |
| 6,210,351 | B1 | * | 4/2001 | Korenaga | A61H 9/0021 601/149 |
| 6,572,570 | B1 | | 6/2003 | Burns et al. | |
| 7,037,280 | B1 | | 5/2006 | Burns et al. | |
| 8,088,087 | B1 | * | 1/2012 | Lunter | A61H 9/0021 601/149 |
| 8,348,871 | B2 | | 1/2013 | Elliott et al. | |
| 8,348,872 | B2 | | 1/2013 | Lunter et al. | |
| 2007/0100261 | A1 | * | 5/2007 | Turell | A61H 9/0071 601/55 |
| 2009/0312679 | A1 | * | 12/2009 | Elliott | A61H 9/0021 601/158 |

FOREIGN PATENT DOCUMENTS

| | | | |
|---|---|---|---|
| CN | 108210300 | A | 6/2018 |
| EP | 0578378 | A1 | 1/1994 |
| JP | 2003260103 | A | 9/2003 |
| JP | 5177507 | B2 | 4/2013 |
| KR | 200349944 | Y1 | 5/2004 |
| RU | 155421 | U1 | 10/2015 |
| RU | 2646573 | C2 | 3/2018 |
| RU | 182500 | U1 | 8/2018 |
| WO | 9528904 | A1 | 11/1995 |

OTHER PUBLICATIONS

Office Action from Russian Patent Application No. 2021127522, issued Mar. 27, 2023, all enclosed pages cited.

Extended European Search Report of European (PCT) Patent Application No. 20763725.7, issued Oct. 10, 2022, all enclosed pages cited.

Office Action from Chinese Patent Application No. 202080031745.8, issued Apr. 22, 2023, all enclosed pages cited.

Extended European Search Report of European Divisional Patent Application No. 24158941.5, issued Jun. 5, 2024, all enclosed pages cited.

Second Office Action from Chinese Patent Application No. 202080031745.8 issued Jan. 30, 2024.

* cited by examiner

APPARATUS FOR DRY HYDRO-THERAPY BODY MASSAGE IN A RECLINED POSITION

CLAIM OF PRIORITY

This application claims priority to U.S. Provisional Application No. 62/811,928, filed Feb. 28, 2019, the entire disclosure of which is incorporated by reference herein.

FIELD OF INVENTION

The present disclosure relates generally to apparatus for applying a massaging effect to the body of a user and, more particularly, to dry hydro-therapy body massage apparatus utilizing a fluid spray assembly for massage effect.

BACKGROUND

Massage is a time-honored and effective therapy for muscular injuries, strains and general soreness. However, although massage is recommended by many physicians for such purposes, this therapy has limited availability due to a scarcity of trained, qualified masseurs. As a result, many devices and apparatus have been proposed in the past for producing a massage-like manipulation of a user's body by various means, ranging from mechanically or electrically-generated vibrations or pulsations, usually accompanied by heating, to pulsations of pressurized water, applied either in a wet environment, such as partially submerging the user's body in a bath device, or in a dry environment in which a fluid spray assembly is housed in a fluid-tight bed or chair-type structure for applying a massaging effect to the user's body without requiring the user to disrobe.

Representative examples of the latter form of apparatus, often commonly referred to as dry hydro-therapy massage, are disclosed in U.S. Pat. Nos. 4,635,620; 4,751,919; 4,757,808; 4,908,016; 4,976,256; 5,074,286; 5,713,834; and 6,036,663. Such apparatus have met with moderate success, and efforts continue within the relevant industry to expand their acceptance, availability and usefulness.

The majority of such known hydro-therapy massage apparatus are in the form of a bed-type structure having an essentially horizontal user support surface on which the user may lay in a recumbent position. Advantageously, the horizontally recumbent position of the user's body in such bed-type structures enables the massaging fluid spray to be applied via a manifold device arranged for lengthwise travel within the interior of the apparatus in an essentially linear path of travel alongside the body of a user, allowing either a portion or the entire length of the user's body to be treated by the hydro-therapy massage.

On the other hand, one of the perceived disadvantages of a bed-type dry hydro-therapy apparatus is that the supine disposition of the user is not conducive to enabling the user to engage in other activities during the operation of the apparatus, e.g., reading, watching television, operation of a laptop computer or other personal electronic device, etc. Additionally, experience has shown that many individuals feel uncomfortable using a massage apparatus in public in which they are required to lie down on the machine. Many users suggest that a reclined or seated disposition would lead them to feel less vulnerable. For such reasons, a desire has been expressed in the industry for a dry hydro-therapy massage apparatus wherein the user rests in a generally seated disposition during operation of the apparatus, allowing the user to read a book or magazine, watch television, or remain otherwise occupied with other activities.

Some known apparatus to address this need include a chair for performing dry hydro-massage on a user in a seated position. While such chair apparatus have met with a reasonable degree of success, a limitation of the apparatus is that due to the position of the user being in a seated position, the force exerted on the upper body portion of the user by the pressurized water jets may cause the user to slide along the support surface on which the user is disposed. As such, it is not uncommon for the pressurized water jets to not make contact with the optimal position on the user for achieving the desired massage results. As such, the need remains for hydro-therapy massage apparatus in which the user is maintained in the desired reclined and/or seated position during the massage operation.

Another common issue with existing hydro-therapy massage apparatus is the egress of water vapor from the interior as a user gets on the apparatus, and the subsequent ingress of ambient air into the interior of the apparatus when the user gets off of the apparatus. For example, typical hydro-therapy massage apparatus include a tank of water holding between 20 and 80 gallons of water, a small amount of which exits the apparatus as water vapor when the user gets on the unit and the interior volume of the apparatus is slightly reduced. For example, existing apparatus may have approximately a cubic foot of air and entrained water vapor that is pushed out of the apparatus with each use. This small loss of water from the apparatus with each use ultimately requires that additional water be added to the interior of the apparatus, such as up to three gallons a day. Moreover, the ingress of ambient air along with the corresponding potential contaminants such as, but not limited to, dust, dirt, dander, etc., may increase the need for periodic maintenance as the interior components of the apparatus may become fouled more frequently. As such, there exists a need for hydro-therapy massage apparatus with improved retention of water vapor as users lie/sit on the support surface of the apparatus.

As noted above, typical prior art hydro-therapy massage apparatus utilize from between 20 to 80 gallons of water, which is retained within their interior volumes. Such high volumes of water may be impractical for known apparatus to provide a secondary containment volume for retaining such amounts of water should a catastrophic and/or extended minor leak from the apparatus occur. As such, there exists a need for hydro-therapy massage apparatus that utilize smaller volumes of water to help prevent damage from potential leaks.

SUMMARY

One embodiment in accordance with the present disclosure is an apparatus for dry hydro-therapy body massage of a user in a reclined position, including a housing structure having a user support surface for supporting the user in a seated position, the user support surface including a substantially-planar seat back portion, a seat portion with a semi-cylindrical main seat section and a substantially-planar leg seat section, wherein the seat back portion and the leg seat section are in relative angular relation to each other and the main seat section is disposed therebetween, and the seat back portion is adapted to support an upper body portion of the user, the leg seat section is adapted to support an upper leg extent of a lower body portion of the user, and the main seat section is adapted to support a buttocks of the user, and a fluid spray assembly interiorly within the housing structure for directing a fluid stream at the user support surface for imparting a massaging effect through the user support surface to the upper body portion and lower body portion of the user.

Another embodiment of the present disclosure is an apparatus for dry hydro-therapy body massage of a user including a housing structure having a housing shell and a user support surface for supporting the user in a reclined position, the housing shell including a bottom wall and a plurality of side walls extending upwardly therefrom, wherein the user support surface is secured to an upper perimeter of the side walls, thereby defining an interior chamber, a vapor circulating system including a body defining an interior chamber, wherein the interior chambers of the housing structure and the vapor circulating system are in fluid communication with each other via a first passage, and the interior chambers of the housing structure and the vapor circulating system form a closed system.

The accompanying drawings, which are incorporated in and constitute a part of this specification, illustrate one or more embodiments of the disclosure and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended drawings, in which.

Figure 1A:
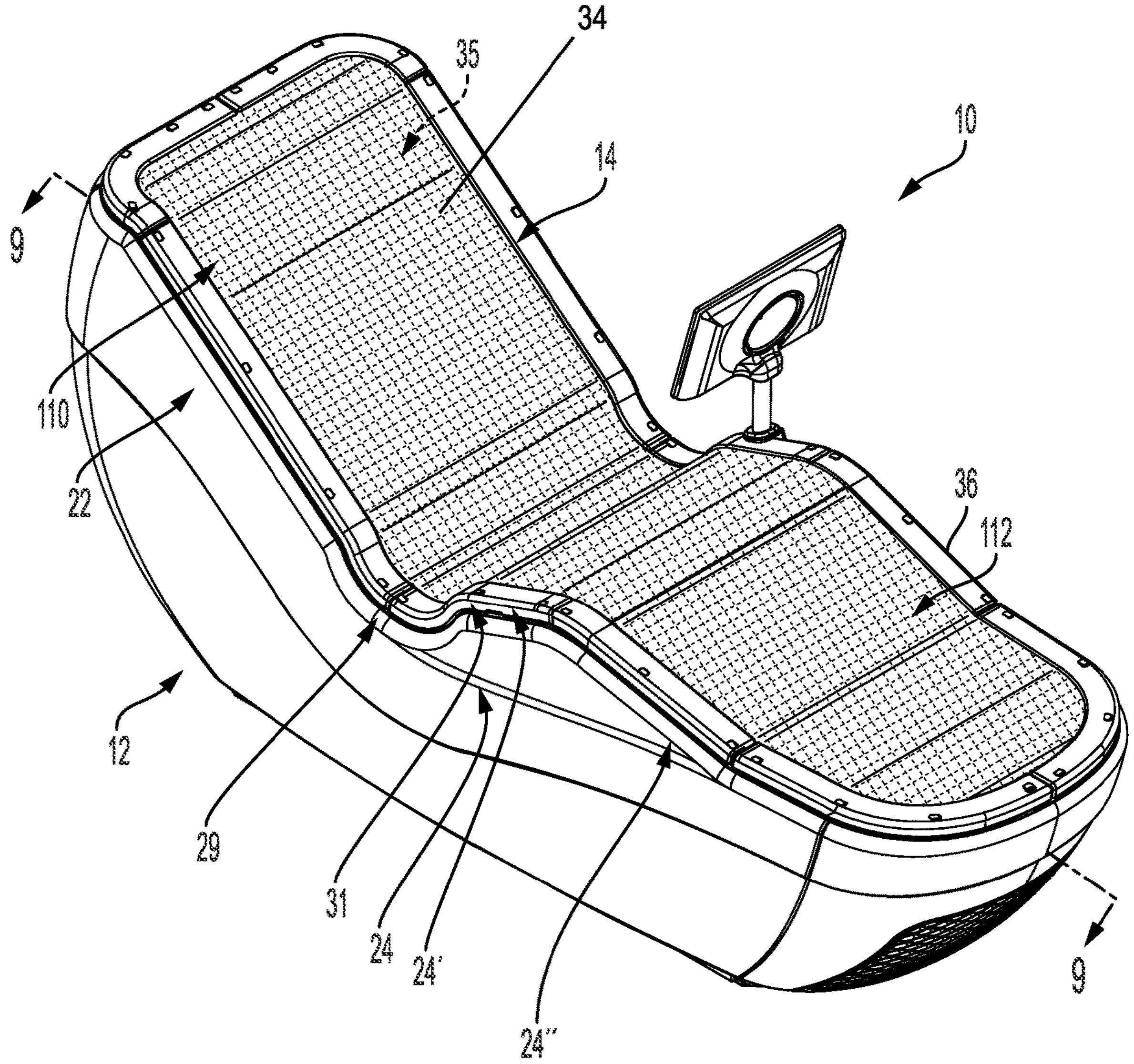
FIGS. 1A and 1B are perspective and side views of a dry hydro-therapy massage apparatus in accordance with an embodiment of the present disclosure.

Repeat use of reference characters in the present specification and drawings is intended to represent same or analogous features or elements of the invention according to the disclosure.

DETAILED DESCRIPTION

As will be readily understood by persons skilled in the relevant art, the dry hydro-therapy apparatus of the present disclosure is readily adapted to be embodied in many and various forms to accommodate massage of a user in differing seated positions. The present disclosure is described herein in one contemplated embodiment of such apparatus, but only for purposes of providing an exemplary enabling disclosure of the invention and, in particular, the invention is not intended to be limited, and should not be construed as limited, to application or embodiment in such apparatus nor any other particular structure except as defined in the claims appended hereto.

Referring now to the accompanying drawings and initially to FIGS. 1A, 1B, 2 and 3, a dry hydro-therapy body massage apparatus according to one embodiment of the present disclosure is generally indicated at 10. The body massage apparatus 10 includes a housing structure, generally indicated at 12, generally in the form of a lounge chair style structure, presenting an upwardly facing side 14 forming a user support surface configured for a user 100 to rest thereon for massage treatment in a seated reclining position, as more fully explained hereinafter. A fluid spray assembly, generally indicated at 16 (FIG. 2), is disposed within the housing 12 in association with a pressurized fluid supply arrangement, generally indicated at 18 (FIG. 3) which pulls from the basin 28 (FIG. 7B), for directing a pressurized fluid emission at the underside of the user support surface 14 to transmit a massaging effect there-through to the body of the user 100 seated thereon.

The lounge chair structure 12 includes a chair body formed as a substantially hollow housing shell 20 (FIGS. 7A, 7B and 8) generally in the form of a tank or tub of an elongated configuration closed at its bottom 30 and side walls 21 and substantially open at its top to define an upwardly-facing elongated opening. The housing shell 20 may be fabricated of any suitable watertight, rigid material of appropriate strength which may be formed to the desired configuration herein described, e.g., fiberglass, plastic, or a like material. The housing shell 20 is supported on a floor-standing frame 25 (FIG. 3), e.g., fabricated of any suitable structural material (metal bar stock, tubing, fiberglass or the like), to elevate and orient the user support surface 14 at a desired height and inclination above the floor while also providing an open volume 19 (FIGS. 2 and 9) within the frame 25 and beneath the housing 20 for enclosure of various operating components of the body massage apparatus 10.

Figure 3:
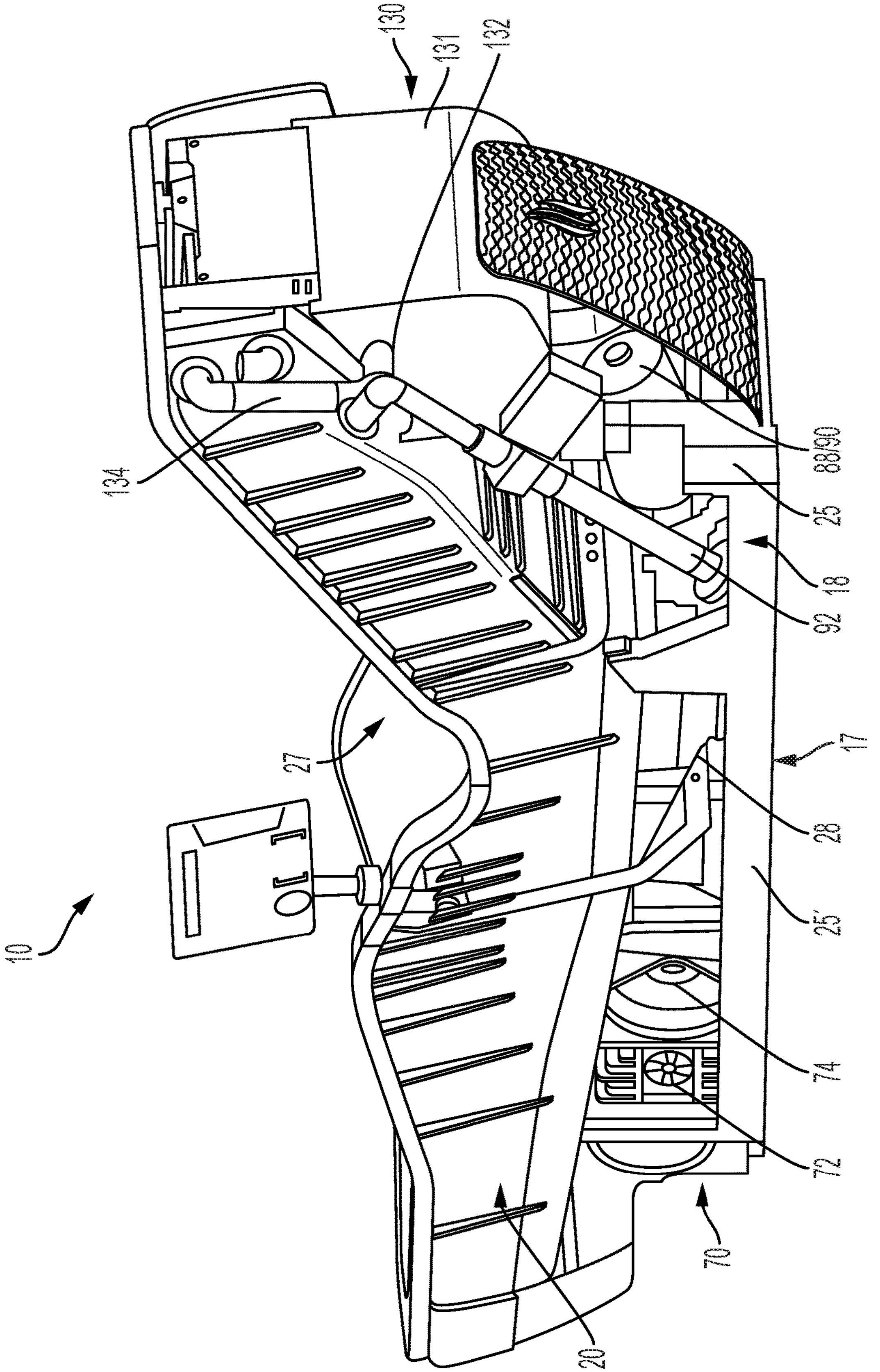

As best seen in FIG. 3, standing frame 25 of the body massage apparatus 10 includes a continuous upwardly-extending bottom lip 25' that forms a leak-proof volume with a bottom wall 17 of the frame 25. As such, in the unlikely event that a leak develops in the housing shell 20, or any of the components and piping supported by the frame 25, the water will be retained within the frame 25, thereby preventing damage to carpets, flooring, etc., that are disposed under the body massage apparatus 10. As discussed in greater detail below, the ability of the disclosed body massage apparatus 10 to continuously function with as little as 8 to 12 gallons of water retained therein is what makes inclusion of the described leak retention volume possible.

Figure 1B:
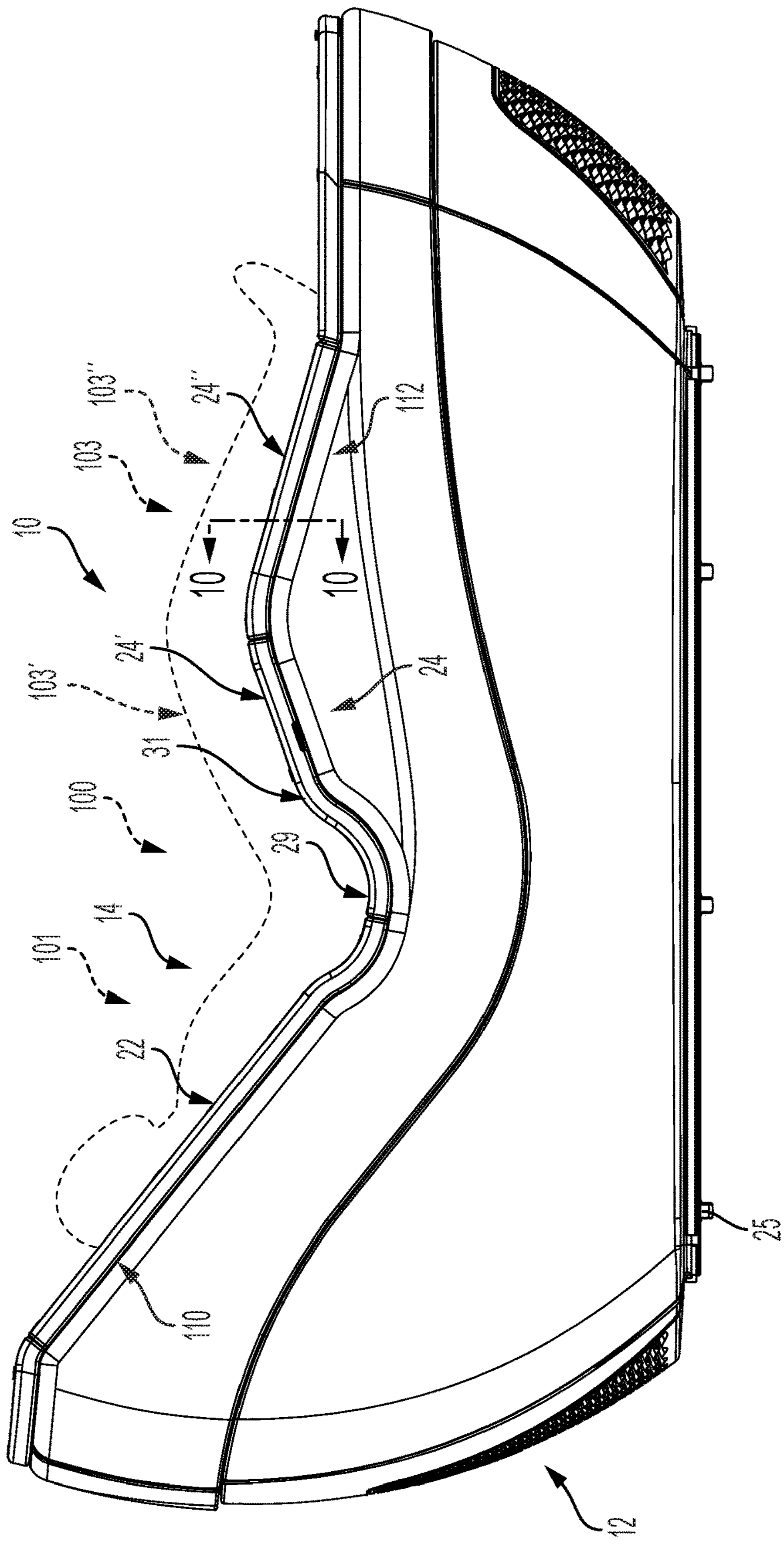
Figure 2:
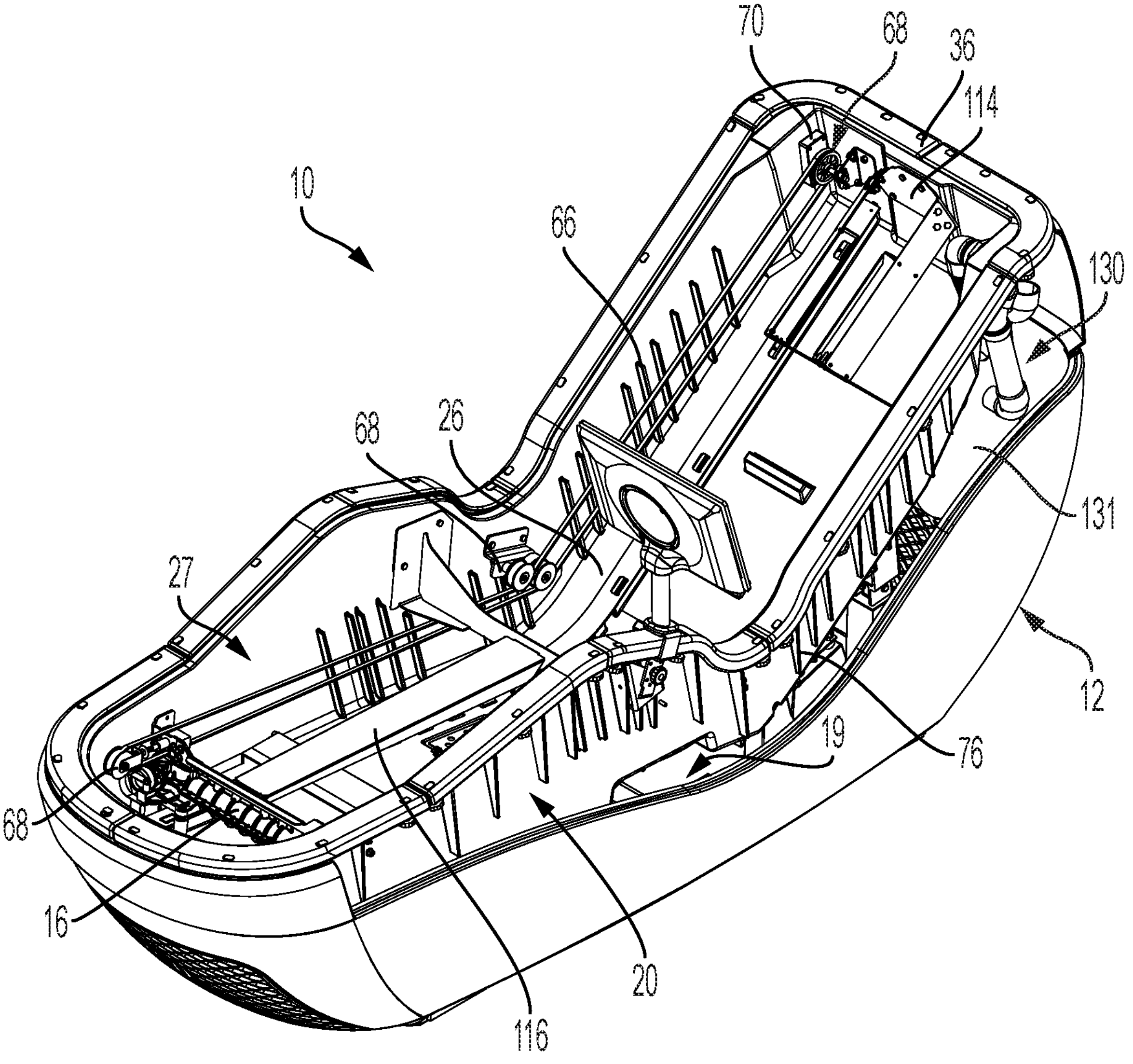
FIGS. 2 and 3 are partial cut-away views of the massage apparatus shown in FIGS. 1 and 2.

As best seen in FIG. 1B, the lateral side walls 21 of the housing shell 20 are contoured to form a substantially-planar seat back portion 22 and a seat portion 24 having a substantially-planar leg seat section 24', an ottoman section 24", and a main seat section 29, the ottoman section 24" being angularly oriented with respect to the leg seat section 24', forming the user support surface 14. Preferably, the seat back portion 22 and the leg seat section 24' are angularly oriented with respect to each other, with the main seat section 29 being disposed therebetween. The user support surface 14 is configured so that the upper and lower body portions 101 and 103, respectively, of the user 100 are supported in a generally reclining seated disposition comparable to that of a lounge style chair wherein the user's body rests bent at the waist and knees with the upper body portion 101 partially reclined on the seat back portion 22, the upper leg extent 103' of the lower body portion 103 slightly inclined on the leg seat section 24', and the lower leg extent 103" slightly declined on the ottoman section 24". The slight bend of the knees of the user's legs help to push the legs down into the user support surface 14, resulting in a more effective massage than with traditional units having planar support section for the lower body of the user.

As shown, main seat section 29 is semi-cylindrical in shape and extends below the area that would be the intersection of seat back portion 22 and leg seat section 24'. As such, a slight ridge 31 is formed at the intersection of main seat section 29 and leg seat section 24'. As such, when a user is disposed on the user support surface 14, the ridge 31 prevents the force exerted by the pressurized fluid jets that impact the user from causing the user to slide along the leg seat section 24'. As well, the main seat section 29 helps to position the user's lower back and buttocks for a stronger massage as the majority of the user's weight is supported by these areas. As such, proper positioning of the user on the user support surface 14 is maintained and, subsequently, the pressurized water jets will impact the user in the proper areas of the user's body to achieve the desired massaging effect.

Figure 8:
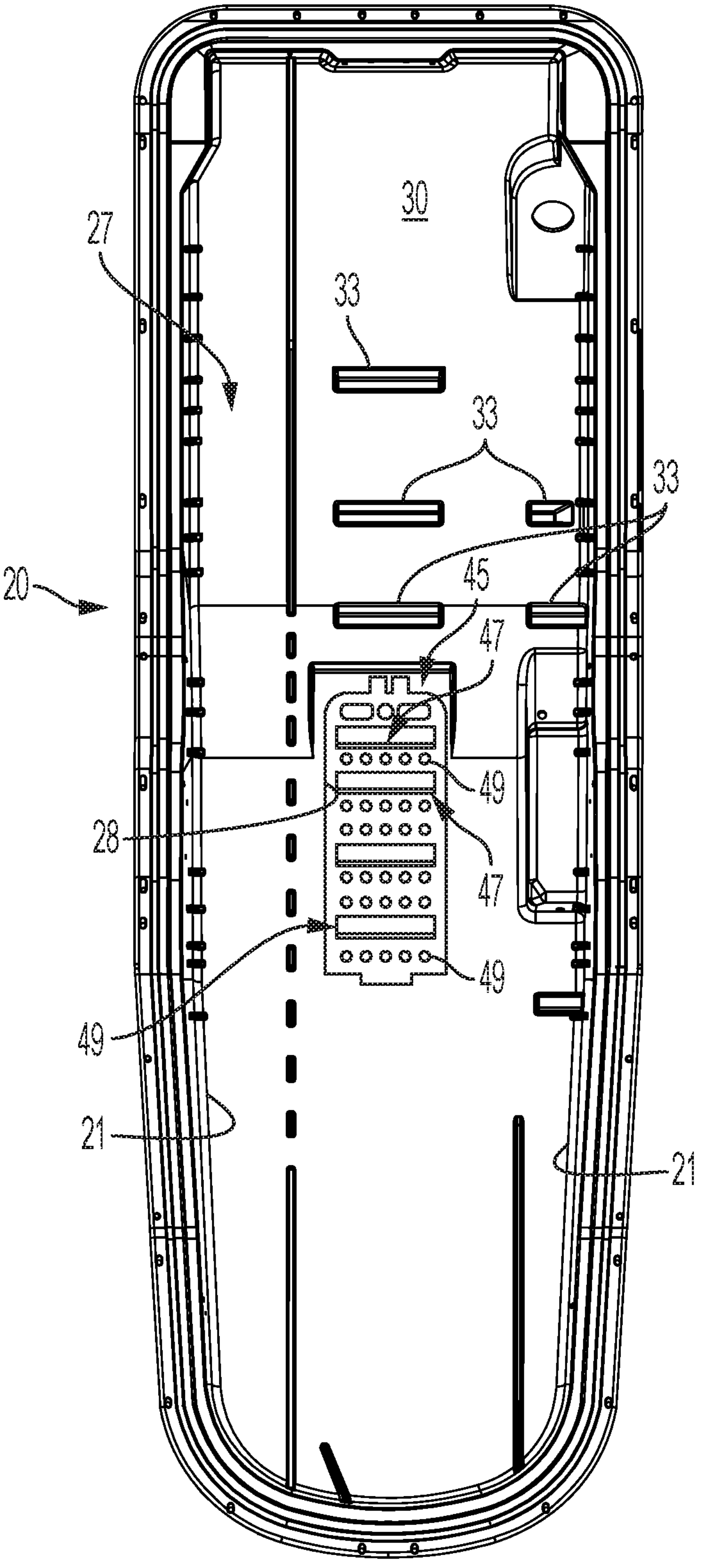
FIG. 8 is a top plan view of the housing shell shown in FIGS. 7A and 7B.
Figure 9:
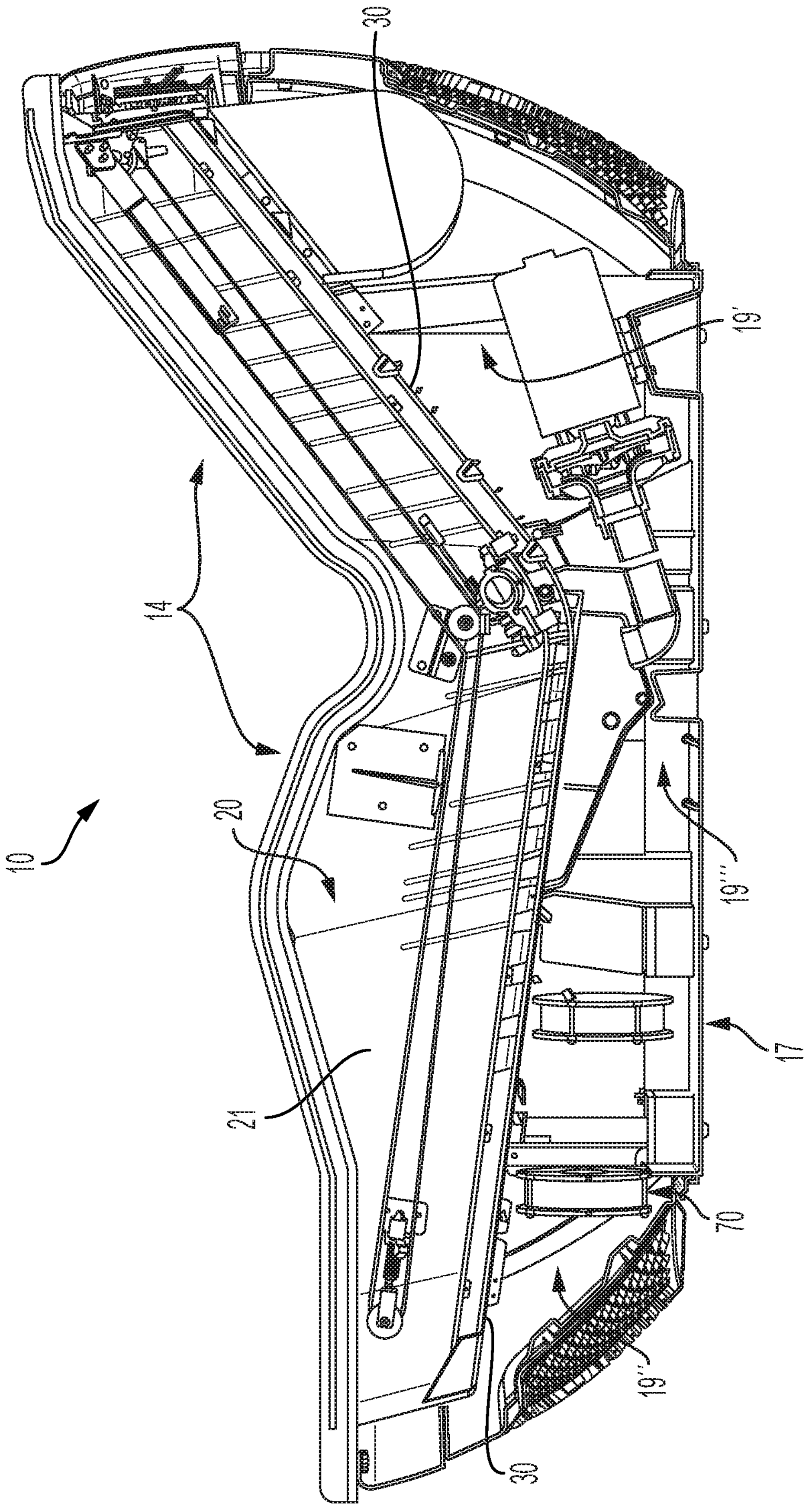
FIG. 9 is a cross-sectional side plan view of the massage apparatus shown in FIGS. 1A and 1B, taken along line 9-9 of FIG. 1A.

Referring now to FIGS. 8 and 9, a hollow interior chamber 27 is defined by the housing shell 20. The bottom wall 30 of the housing shell 20 forms a drainage surface inclining into a reservoir basin 28 centrally along the lengthwise extent of the housing shell 20. Preferably, to ensure the water returning to the reservoir basin 28 flows down the drainage surfaces at the desired rate, a plurality of water features in the form of dams 33 extend upwardly from the bottom wall 30 of housing 20. If water returning to the reservoir basin 28 flows down the drainage surfaces too quickly, it is possible that the water will pass over the reservoir basin 28 rather than entering it. Such rapid water return rates require that a larger volume of water be maintained in the reservoir basin 28 to ensure continuous operation of the massage apparatus 10. By utilizing dams 33 to control the rate of return of water to the reservoir basin 28, the present embodiment of massage apparatus 10 is capable of operating with as little as 8 to 12 gallons of water retained within the apparatus. The present embodiment of massage apparatus 10 is capable of flowing water through the fluid spray assembly 16 at the rate of approximately 105 gallons per minute, with only the 8 to 12 gallons retained within the apparatus, although alternate embodiments function at varying flow rates. As previously noted, existing apparatus require a minimum of 20 gallons of water to be retained therein for continuous operation. Additionally, as shown in FIG. 8, a baffle plate 45 is disposed in the opening to the reservoir basin 28. The baffle plate 45 includes a plurality of baffles 47 extending upwardly therefrom, and a plurality of openings 49 disposed therebetween. The baffles 47 assist in redirecting the flow of water downwardly into the reservoir basin 28 in a uniform manner so that the water in the reservoir basin is less turbulent than in prior art massage apparatus. As such, the potential for cavitation within the liquid pump 88 of the pressurized fluid supply arrangement 18 is decreased.

A liquid material is preferred as the fluid medium utilized by the body massage apparatus 10 for supply to and emission from the fluid spray assembly 16 to produce a massage effect as hereinafter described, water being an optimal liquid in view of its ready availability and generally non-corrosive and non-caustic character. As noted, a suitable supply of water (8 to 12 gallons), or another appropriate liquid, is stored in the reservoir basin 28 for continuous circulation through the fluid supply arrangement 18 and the fluid spray assembly 16, the bottom drainage wall 30 as well as the other interior surfaces of the housing shell 20 being configured to drain the liquid emitted from the fluid spray assembly 16 into the basin 28. Of course, as those persons skilled in the art will readily recognize, pressurized air, other gases, and other fluidic materials could also be utilized as the fluid massaging medium without departing from the scope and substance of the present disclosure and, accordingly, the present disclosure is not intended to be and should not be construed as limited to the use of water or another liquid massage medium.

It is also preferred that the water or other massage liquid be heated to enhance the massaging effect produced by the liquid, e.g., to a temperature approximating normal body temperature, preferably in the range of 95 to 100 degrees Fahrenheit, although the apparatus has the capability of a broad range of liquid temperatures. For this purpose, a heater element (not shown) may be provided, e.g., mounted within the liquid reservoir basin 28 below the normal level of massage liquid therein to be substantially continuously submerged in the stored massage liquid. A thermostat (not shown) is preferably provided in the electrical circuit to the heating element to provide selective control of the temperature of the massage liquid. As shown in FIG. 3, the apparatus is also preferably provided with a liquid cooling system 70 to offset heat gain to the massage liquid that may occur from frictional contact of the liquid while being circulated through the apparatus. As shown, the liquid cooling system 70 includes a heat exchanger 72 in the form of a radiator and one or more fans 74 to draw air across the radiator 72.

As shown in FIG. 9, the liquid cooling system 70 is disposed at the foot of the massage apparatus 10, where it draws in air, the air travels the length of massage apparatus 10 in the volume 19 that exists between the housing shell 20 and the outer housing of the massage apparatus, and then exits the apparatus at its head end. Note, however, the liquid cooling system 70 may be positioned at any point along the length of the massage apparatus 10. Preferably, the open volumes defined between the hollow shell 20, in particular the bottom wall 30, and the outer housing are greater at the foot 19" and the head 19' of the massage apparatus than along the center portion 19'" of the massage apparatus 10. In this manner, ambient air flow drawn into the massage apparatus by the fans 74 (FIG. 3) of the liquid cooling system 70 will undergo a venturi-effect as the air flows from the large foot section, along the smaller center portions, and out the larger head section and exits the massage apparatus 10. The venturi-effect on the air flow assists in more efficiently cooling the interior of the massage apparatus 10 as well as its internal components as the speed of the air increases as it passes over the internal components.

Figure 7A:
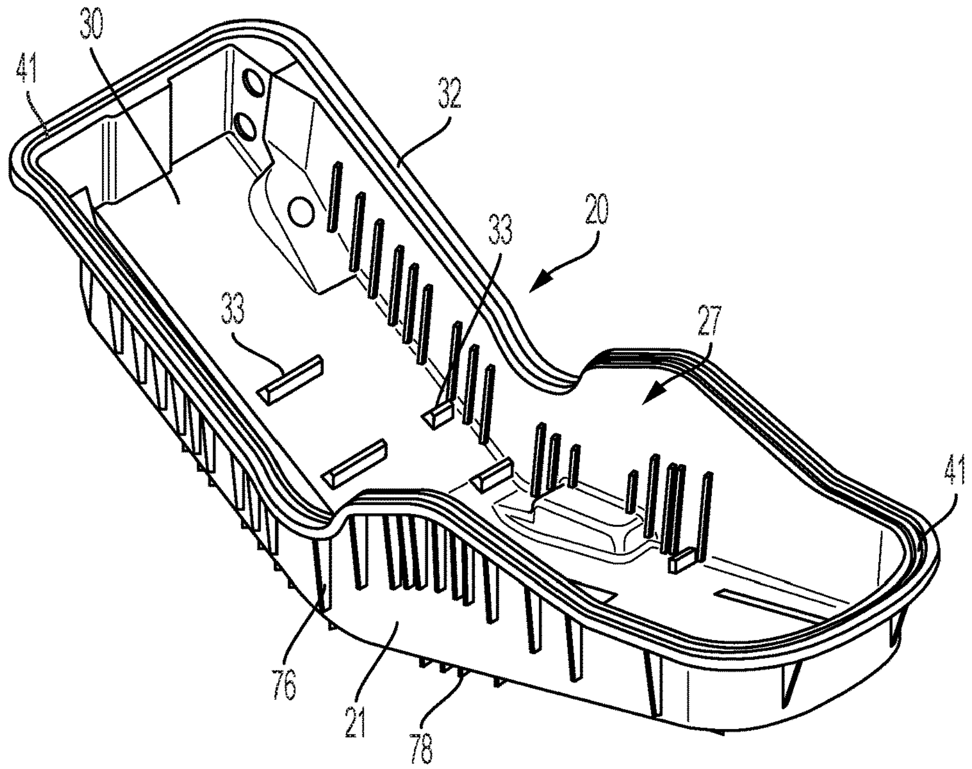
FIGS. 7A and 7B are top and bottom perspective views, respectively, of a housing shell of the massage apparatus shown in FIGS. 1A and 1B.
Figure 7B:
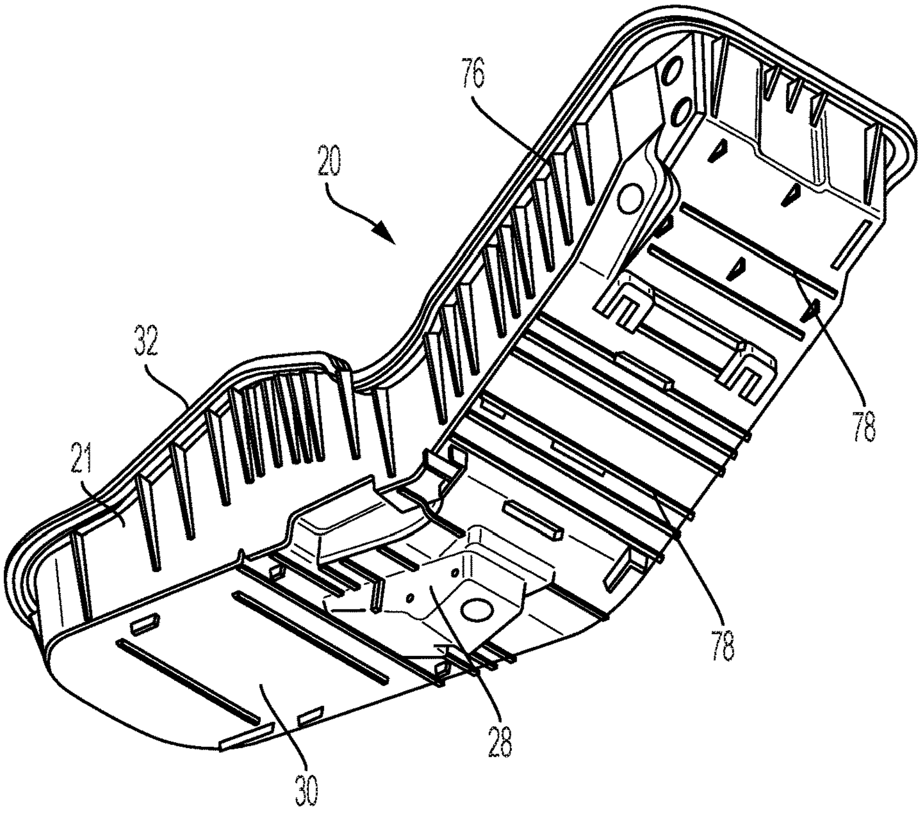

Referring additionally to FIGS. 7A and 7B, the shell 20 includes a plurality of vertically-extending ribs 76 disposed on the outer surfaces of the lateral side walls 21, as well as a plurality of horizontally-extending ribs 78, extending along the width of the bottom wall 30 of the hollow shell 20. The vertical ribs 76 lend rigidity to the lateral side walls 21, whereas the horizontal ribs 78 lend rigidity to the bottom wall of the hollow shell 20. As such, the amount of material utilized in forming both the lateral side walls 21 and the bottom wall 30 of the hollow shell 20 may be reduced, while still maintaining the rigidity of a thicker walled shell. As such, the vertical ribs 76 and horizontal ribs 78 allow for an overall reduction in the weight of the massage apparatus 10 as compared to existing units. The uppermost extent of the housing shell 20 forms a flange surface 32 for mounting thereto of the user support surface 14.

The user support surface 14 may be formed of a relatively thin sheet 34 of a waterproof material affixed in watertight relation across the flange 32 bordering the upwardly facing opening. The sheet 34 preferably is sufficiently thin that the impact of fluid emitted from the fluid spray assembly 16 against the underside of the sheet 34 transmits a massaging effect through the sheet 34 to the body of the user. Further, the sheet 34 is preferably of a sufficient flexibility and resiliency to substantially conform to the body of the user for maximum transmission of the massage effect through the sheet 34 to the user. In this manner, the sheet 34 functions in the nature of a waterproof membrane to keep the user dry during operation of the body massage apparatus 10 without noticeably dampening the massaging impact of fluid emitted from the fluid spray assembly 16. For example, a latex rubber in sheet form, in the range of 15 to 55 mil. thickness, is a suitable material to provide these characteristics for the sheet 34, although various other commercially available rubber and plastic sheeting materials should also provide suitable results.

As a primary means of weight bearing support of the user, an open-mesh netting 35, partially shown in phantom lines in FIG. 1, may be affixed in tensioned condition to the flange 32 of the housing shell 20 horizontally across its opening immediately beneath the sheet 34. The netting 35 should be of sufficient strength to independently support the weight of a user to provide a safety barrier in the event of a rupture or other failure of the sheet 34. At the same time, the open-mesh construction of the netting 35 permits essentially unrestricted transmission of fluid from the fluid spray assembly 16 through the netting 35 and against the underside of the sheet 34. Preferably, the netting 35 is not as taught in the areas of the user support surface 14 that are beneath the user's head and lowermost leg areas. As such, as compared to the remainder of the user support surface, the head and feet of the user are able to "sink" into the user support surface 14 for better positioning and enhanced massaging effect.

Figure 10:
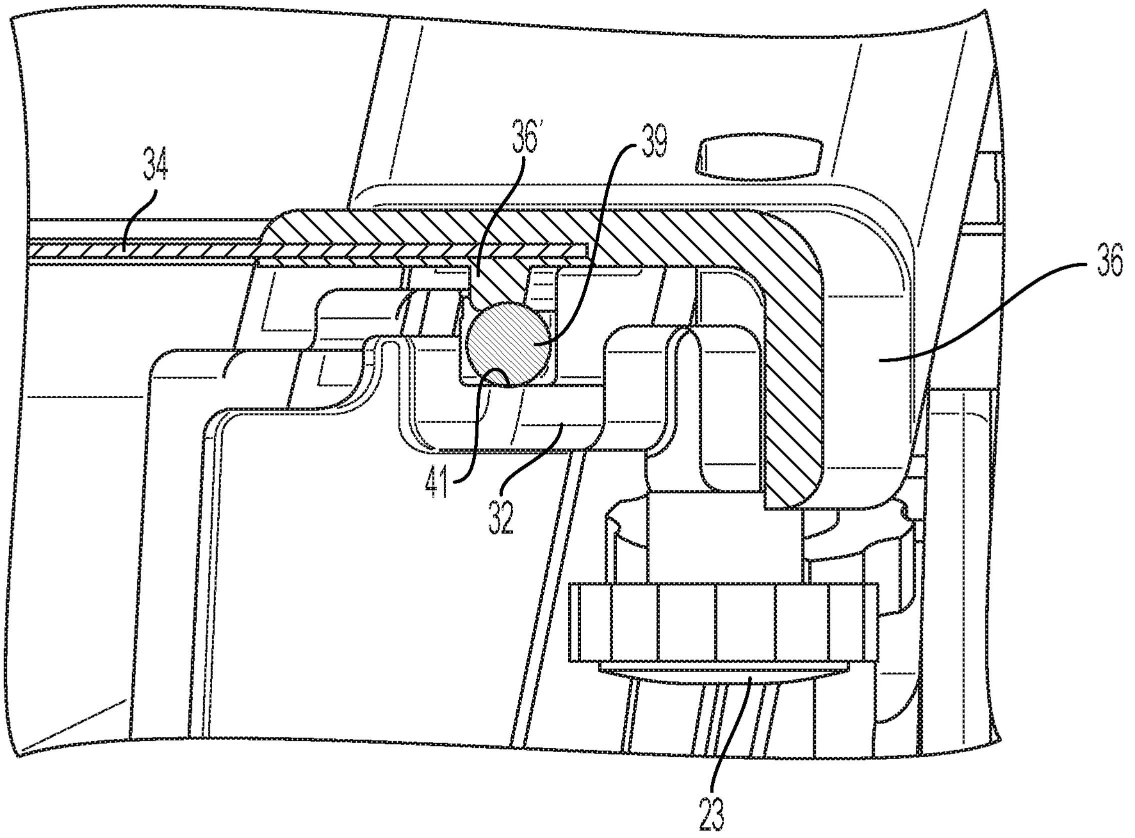
FIG. 10 is a cross-sectional view of the user support retention system of the massage apparatus shown in FIGS. 1A and 1B, taken along line 10-10 of FIG. 1B.

As depicted in FIGS. 1, 7A, and 10, the flange 32 as well as the side walls 21 of the housing shell 20 are covered by frame panels 36 to provide an aesthetically pleasing exterior enclosure of the overall housing shell 20 and the internal operational components housed beneath the shell 20. Specifically, it is important to maintain a proper seal between the interior chamber 27 of the hollow shell 20 and the sheet 34 in order to prevent the loss of water from the interior of the massage apparatus 10. As such, a continuous groove 41 is provided along the entire length of the upper surface of the flange 32 of the hollow shell 20, with the continuous groove 41 being configured to receive an O-ring 39 therein. As shown in FIG. 10, the outer perimeter of sheet 34 extends over the annular groove 41 in which the O-ring 39 is then placed. With the O-ring 39 in place, a series of interlocking frame panels 36 are fastened into place by threaded knobs 23 that engage the underside of the flange 32, thereby securing the sheet 34 to the flange 32. In alternate embodiments, frame panels 36 may be secured to flange 32 by snapping them into place via interlocking features with the flange 32. A downwardly-extending protrusion 36' extends from the bottom surface of each frame panel 36 into the continuous groove 41, thereby compressing the O-ring 39 and enhancing the water tight seal of the massage apparatus 10. Note, the interlocking features of the frame panels 36 allow the frame panels 36 to be removed and re-installed without the use of tools, as necessary for servicing the unit. Additionally, the upper surface of the frame panels 36 covering and bordering the flange 32 may preferably be cushioned for the comfort of the user during ingress and egress of the user support surface 14.

Figure 5:
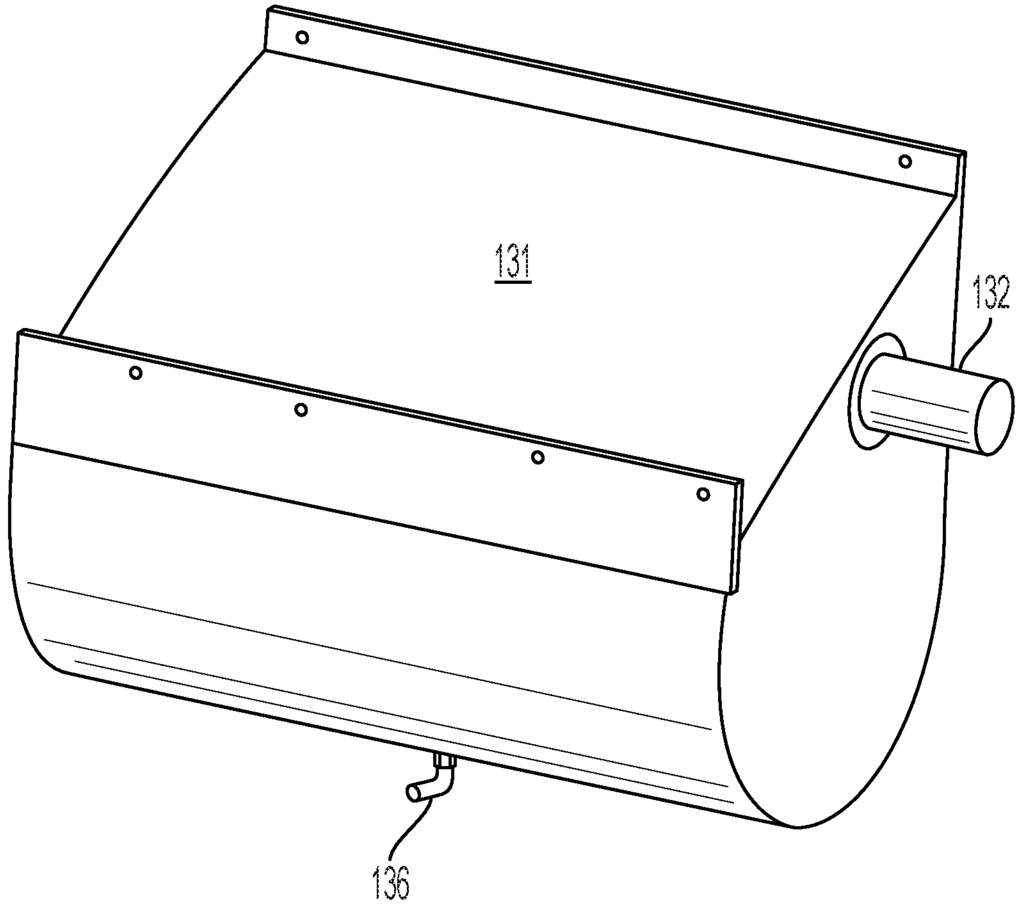
FIG. 5 is a perspective of a water vapor circulating system of the massage apparatus shown in FIGS. 1A and 1B.

Other than the portion of the interior chamber 27 occupied by the water stored in the basin 28 and the area occupied by the fluid spray assembly 16 and the fluid supply arrangement 18, the interior chamber 27 of the housing shell 20 is substantially filled with air. As such, as one would expect, when a user lies down on the user support surface 14, thereby reducing the interior volume of the interior chamber 27 as the user support surface 14 moves slightly downwardly into the interior chamber 27, some air and potentially entrained water vapor would be expected to egress from the hollow shell 20. In order to prevent a subsequent ingress of surrounding air and dust, dirt, etc., into the interior of the hollow shell 20, the present massage apparatus 10 includes a water vapor circulating system 130, as best seen in FIGS. 3 and 5. As shown, the water vapor circulating system 130 includes an inflatable chamber 131 that is secured to the outer surface of the head portion of the hollow shell 20, and is connected to the interior of the hollow shell 20 via piping 134 that is connected to an inlet 132 of the chamber 131. As such, when air and entrained water vapor is forced out of the hollow shell 20, it is collected in the chamber 131 rather than egressing to the surrounding environment. When a user dismounts the user support surface 14, rather than drawing in air from the surrounding environment, air is simply drawn back into the hollow shell 20 from the chamber 131. An outlet 136 is provided in the bottom of the chamber 131 to allow the return of condensed water vapor to the hollow shell 20 therethrough. As such, the interior of the hollow shell 20 and the chamber 131 form a closed system, thereby helping to maintain the desired water volume within the massage unit 10, as well as preventing the ingress of dust, debris, etc., from the surrounding environment.

Figure 6:
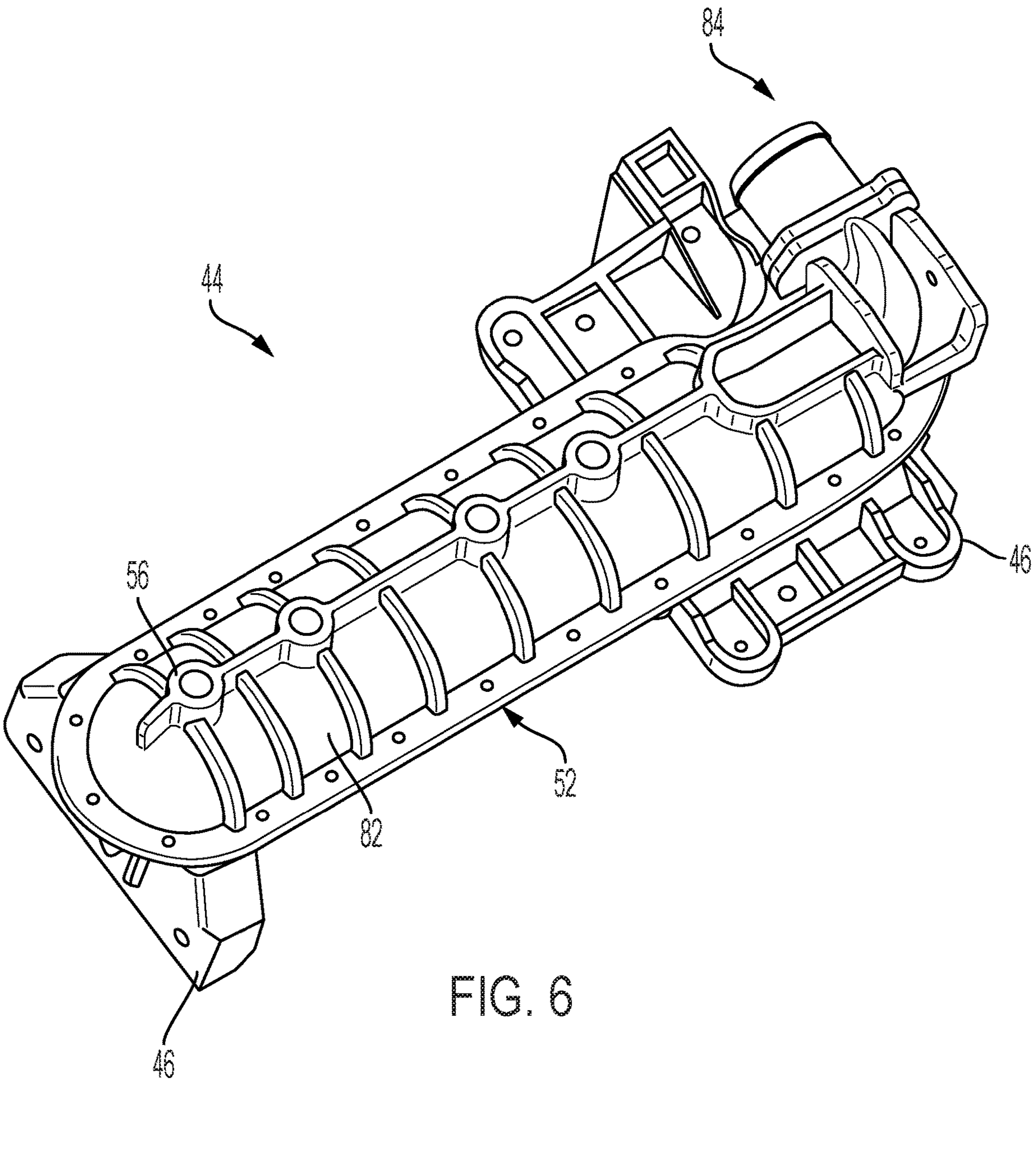
FIG. 6 is a perspective view of an elongated massage spray head of the massage apparatus shown in FIGS. 1A and 1B.

Referring now to FIG. 6, the fluid spray assembly 16 includes an elongate massage spray head, generally indicated at 44, oriented transversely across substantially the widthwise extent of the user's body. The massage head 44 may be of any of various possible configurations and componentry adapted to emit the massage fluid under pressure against the underside of the membrane sheet 34. For example, in one possible configuration, the massage head 44 may have a substantially hollow outer body 52 with a plurality of emission openings 56, each in the form of a nozzle, over substantially the full extent of the upward surface of the body 52 which faces the sheet 34. The emission openings 56 deliver pressurized fluid from the body 52 in a jet-like spray upwardly therefrom against the underside of the membrane sheet 34. Preferably, the elongate massage head 44 and emission openings 56 are configured to provide a jet-like spray that is a combination of both laminar and turbulent flows. Often, existing massage apparatus have jet-like sprays that are strictly laminar flow or strictly turbulent flow. A strictly laminar massaging spray concentrates the force of the spray in a small of an area on the user which can lead to pain and discomfort. On the other hand, strictly turbulent flow can cause the pressure of the massaging spray to be spread out over a large of an area so that the desired massaging effect is not achieved. The present massage apparatus 10 obtains the desired combination of a combined laminar and turbulent flow massaging spray by way of the design of the massage spray head 44 and corresponding emission opening 56, as discussed below.

Figure 11A:
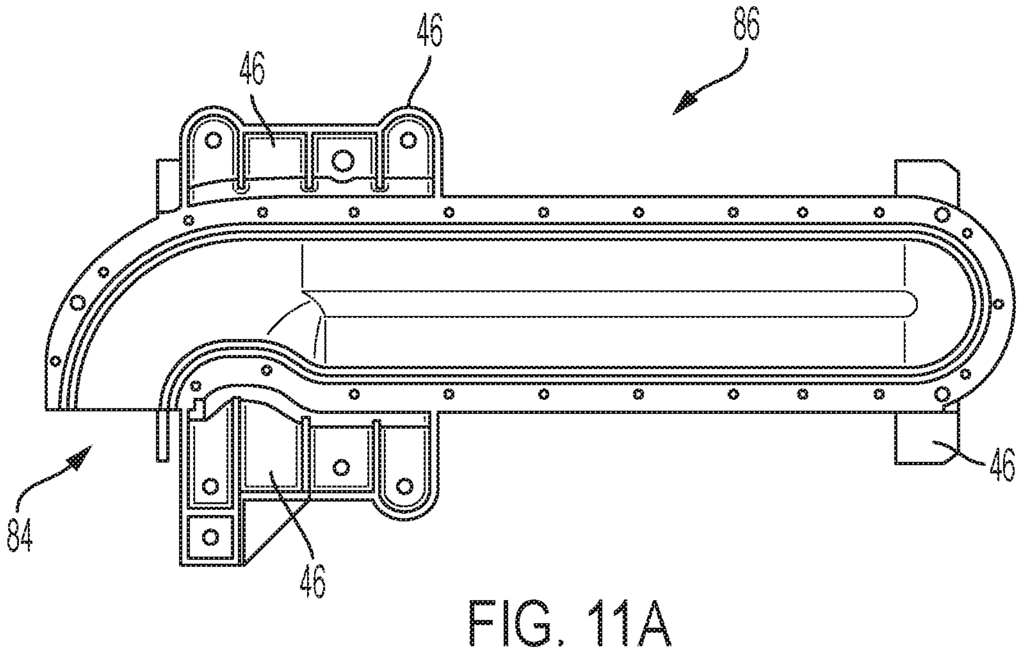
FIGS. 11A and 11B are inner and outer plan views of the elongated massage spray head shown in FIG. 6.
Figure 11B:
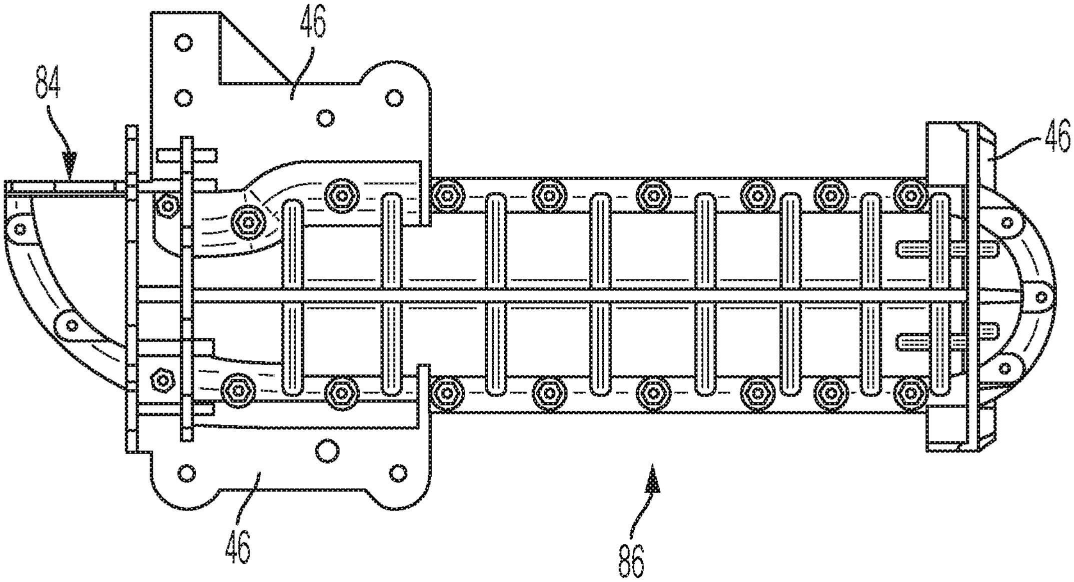
Figure 12A:
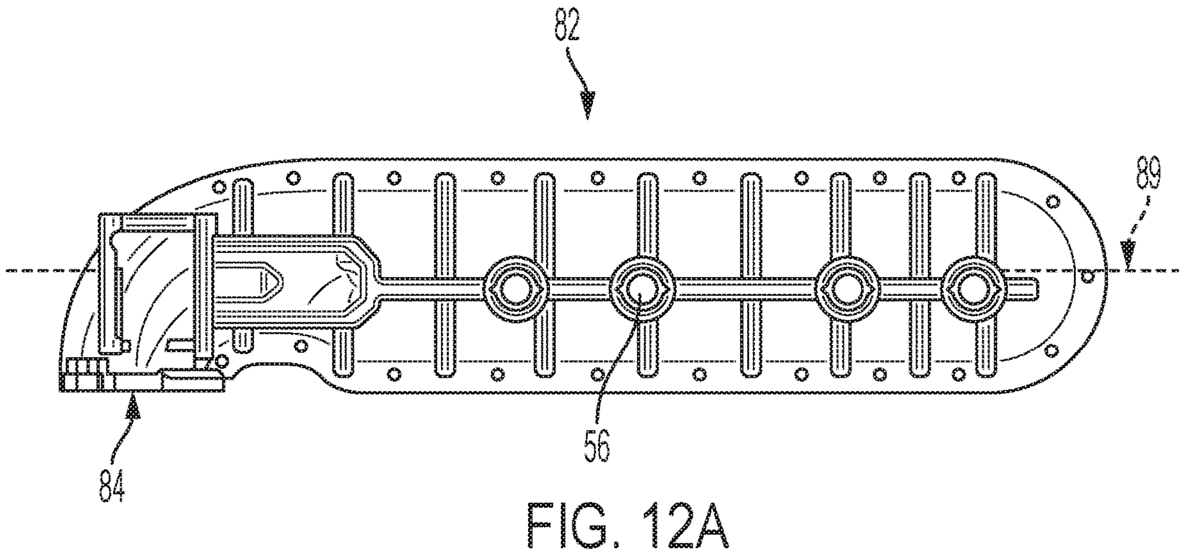
FIGS. 12A and 12B are outer and inner plan views of the elongated massage spray head shown in FIG. 6.
Figure 12B:
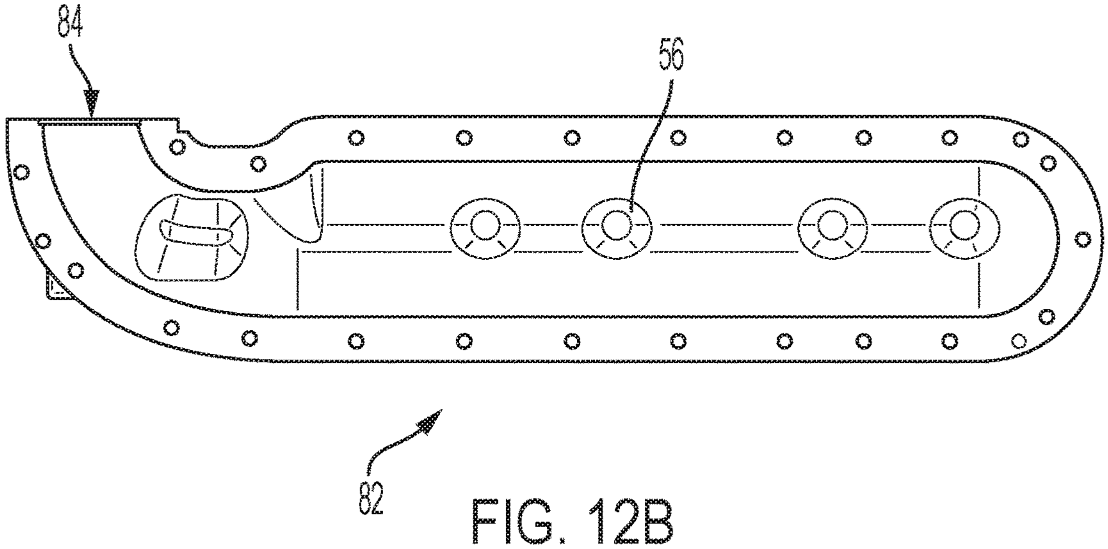
Figure 13A:
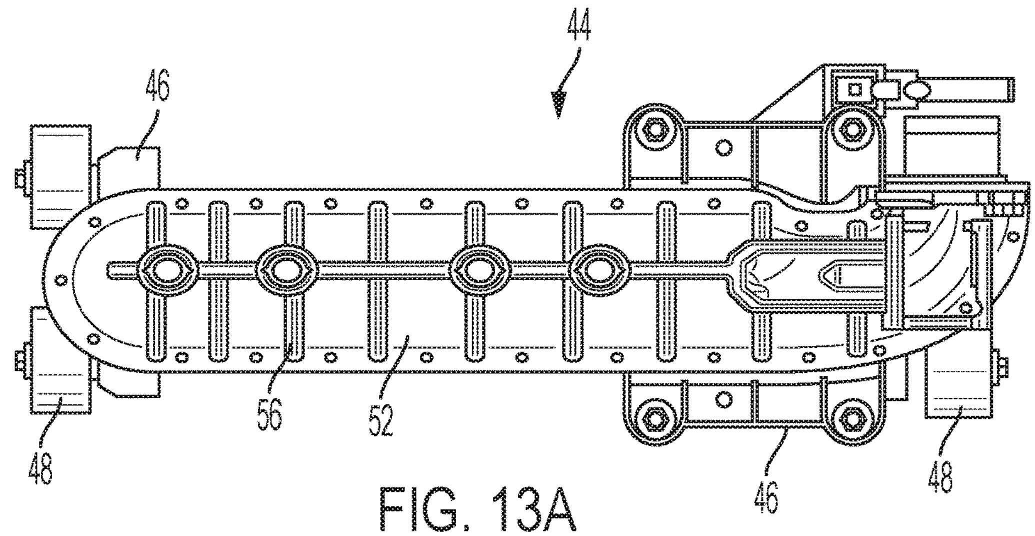
FIGS. 13A, 13B, and 13C are top, rear, and front views of the elongated massage spray head shown in FIG. 6.
Figure 13B:
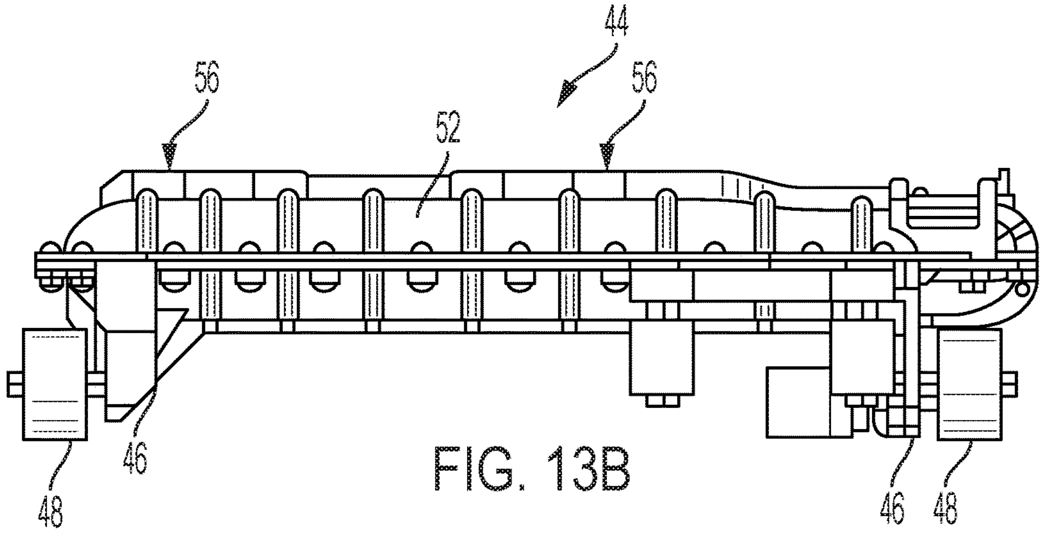
Figure 13C:
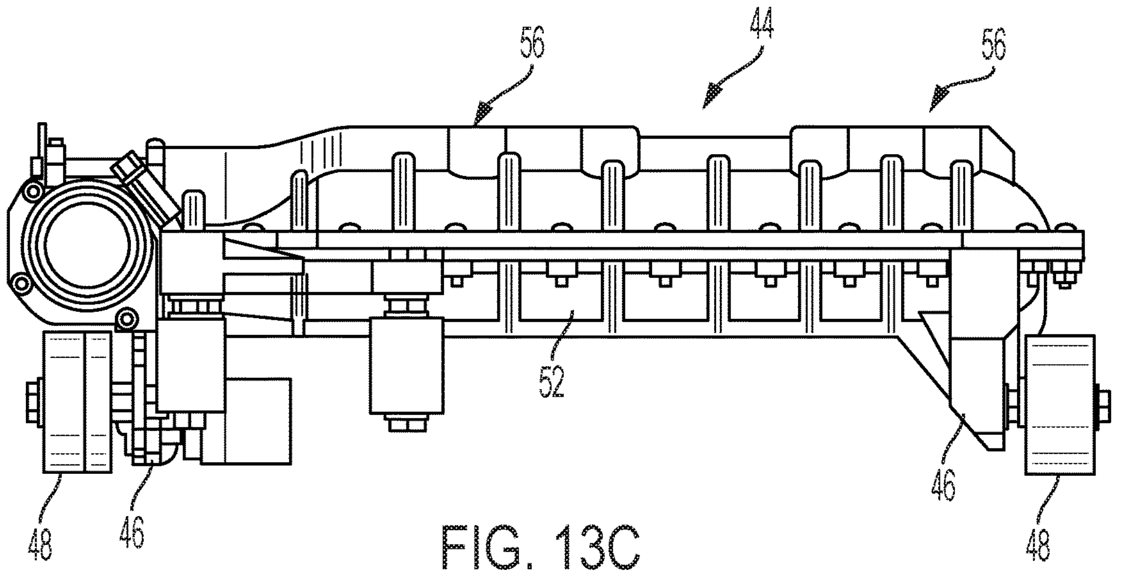

Referring additionally to FIGS. 11A through 12B, the hollow outer body 52 of the massage spray head 44 is preferably formed of an injection molded upper body portion 82 and an injection molded lower body portion 86. As shown in FIGS. 11A and 11B, lower body portion 86 includes a smoothly radiused inlet 84 and a plurality of brackets 46 on each end for receiving corresponding rollers or wheels 48 (FIGS. 13A-13C). The radiused inlet is configured to provide a smooth inlet flow of water into the interior of the outer body 52 so that the flow within the outer body 52 is less turbulent. As best seen in FIGS. 12A and 12B, the upper body portion 82 of the outer body 52 also includes the radiused inlet 84 as well as the plurality of emission openings 56. As shown, the emission openings 56 are disposed along a line that is offset from the longitudinal center axis 89 of the upper body portion 82. The combination of the radiused inlet 84, subsequent laminar flow within outer body 52, and the offset emission openings 56 allow the massage spray head 44 of the present massage apparatus 10 to attain an optimal massage spray that includes both laminar and turbulent flows, resulting in the desired massaging effect. Preferably, the modular design of the massage spray head 44 allows the desired massaging spray pattern to be changed by simply replacing the upper body portion 82 of the outer body 52 with an alternate upper body portion having a different arrangement of emission openings 56.

As best seen in FIGS. 2 and 13A through 13C, the elongate massage head 44 is supported at each opposite end by brackets 46 with rollers or wheels 48 (FIG. 13) for rolling travel along tracks 26 traversingly back-and-forth through substantially the full lengthwise extent of the chamber 27 along angularly changing paths of travel following the angular configuration of the tracks 26. The pair of angular tracks 26 are affixed interiorly to the bottom wall 30 of the housing shell 20, each extending in angular sections in parallel spaced relation to each other through substantially the full lengthwise extent of the chamber 27. The rollers 48 travel along the tracks 26 during lengthwise traversing travel within the chamber 27. Preferably, each track 26 is a one-piece construction, while alternate embodiments may include multi-piece tracks.

The traversing travel of the massage head 44 is driven reciprocally back-and-forth through the lengthwise extent of the massage chamber 27 via any suitable drive mechanism. For, example, in the illustrated embodiment, a toothed timing belt 66 (FIG. 2) is attached at opposite belt ends to each respective bracket 46 at the ends of the massage head 44, forming two endless drive belt loops which are trained about a series of toothed guide pulleys 68 rotatably mounted to the interior surfaces of the side walls 21 adjacent the tracks 26 at each opposite end of the chamber 27 and also at the location of each change of angular direction in the tracks 26. The pulleys 68 at one end of the chamber 27 are secured to a common drive shaft journaled through one side wall 21 and connected exteriorly thereof to a reversible drive motor 70 for imparting synchronous drive motion to the belts 66 and, in turn, to the massage head 44 to travel along the tracks 26. Any suitable form of sensors, such as electric eyes (not shown), may be provided at the limits of the massage head travel to control reversal of the drive motor 70.

Referring again to FIG. 3, the pressurized fluid is delivered from the fluid supply arrangement 18 to the massage head 44 in any suitable way. For example, the pressurized fluid supply arrangement 18 may have an electric motor 90 driving a liquid pump 88 to draw fluid from the liquid reservoir basin 28 of the housing shell 20, e.g., via a submerged tubular fitting. The outlet side of the pump 88 delivers the fluid under pressure to the massage head 44 through a conduit 92 with a flow control valve (not shown) disposed therein and a length of flexible tubing (not shown) connected between the conduit 92 and a fitting on the outer body 52 of the massage head 44.

As will be understood, the widthwise reach of the massage head 44 laterally across the interior chamber 27 effectively applies a massaging action to the full lateral extent of the body of a user supported on the user support surface 14, and in particular across the full width of the user's shoulders, back or chest, mid-section and hips. In the distal head region 110 (FIG. 1B) and leg region 112 of the user support surface 14, by contrast, the fluid spray is not needed across the full widthwise reach of the massage head 44 to accomplish an effective massaging action of the more narrow neck and legs of the user. Therefore, to insure an optimum application of the massaging spray to these selected areas of the user's body, the present disclosure provides a control arrangement, preferably in the form of two deflectors 114, 116, arranged in the interior chamber 27 intermediate the fluid spray assembly 16 and the underside of the user support surface 14 to selectively alter and redirect the directional flow of the fluid spray to be concentrated in a more narrow widthwise portion of the user support surface 14 at predominantly only the user's neck and legs.

Figure 4A:
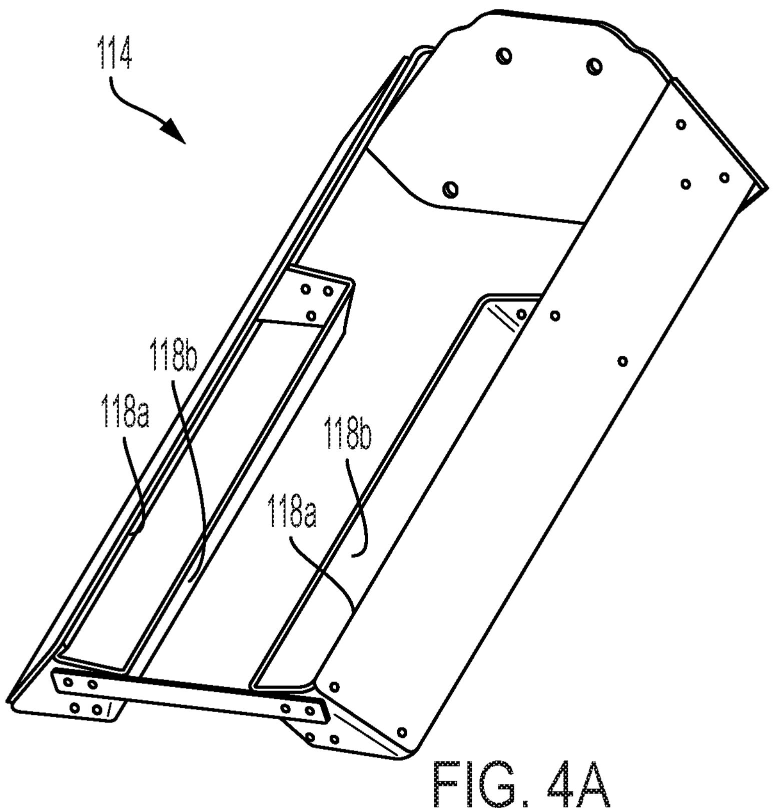
FIGS. 4A and 4B are perspective and cross-sectional views, respectively, of a head/neck spray deflector of the massage apparatus as shown in FIGS. 1A and 1B.
Figure 4B:
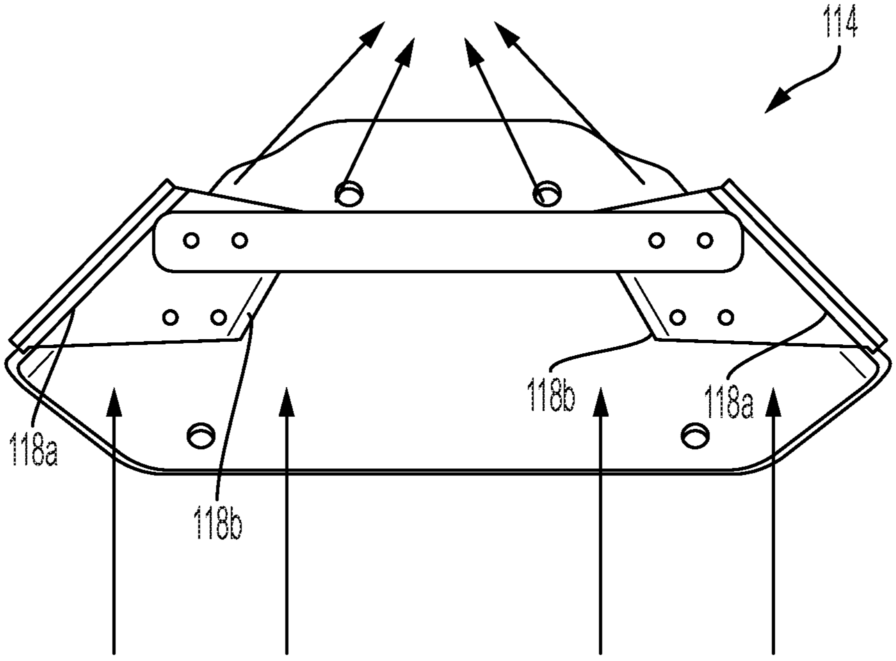

More specifically, as shown in FIGS. 4A and 4B, the head/neck deflector 114 comprises two pairs of deflector plates 118*a* and 118*b* affixed within the interior chamber 27 to the end wall of the housing shell 20, the deflector plates within each pair being at a lateral spacing from one another and extending from the end wall longitudinally of the housing along the underside of laterally outer margins of head region 110 of the user support surface 14 and above the fluid spray assembly 16. The deflector plates 118*a* and 118*b* are thereby respectively disposed outwardly alongside the area of the user support surface 14 on which a user's neck and head will rest and the plates 118*a* and 118*b* within each pair are inclined toward one another in converging relationship for deflecting inwardly toward the underside of the user support surface 14 in the spacing between the plates the portions of the fluid stream from the emission openings 56 of the massage head 44 which would otherwise impact unoccupied areas of the user support surface 14, to thereby redirect the deflected portions of the fluid spray to impact against the neck of the user. In the preferred embodiment shown, there is a deflector plate for each emission opening 56 of the massage spray head 44 so that no massage spray stream impacts directly on the head/neck of the user without first contacting the corresponding deflector plate. The head/neck deflector 114 helps to maximize the massaging effect of the massage head 44 in the soft tissue of the neck area of the user by preventing the direct impingement of any of the water jets on the spinal cord area without first being redirected by a deflector plate. As well, the deflector plates prevent the water jets from impinging on areas of the user support surface that are outside the areas that are directly supporting the user, thereby reducing extraneous noise from the jets.

Figure 14:
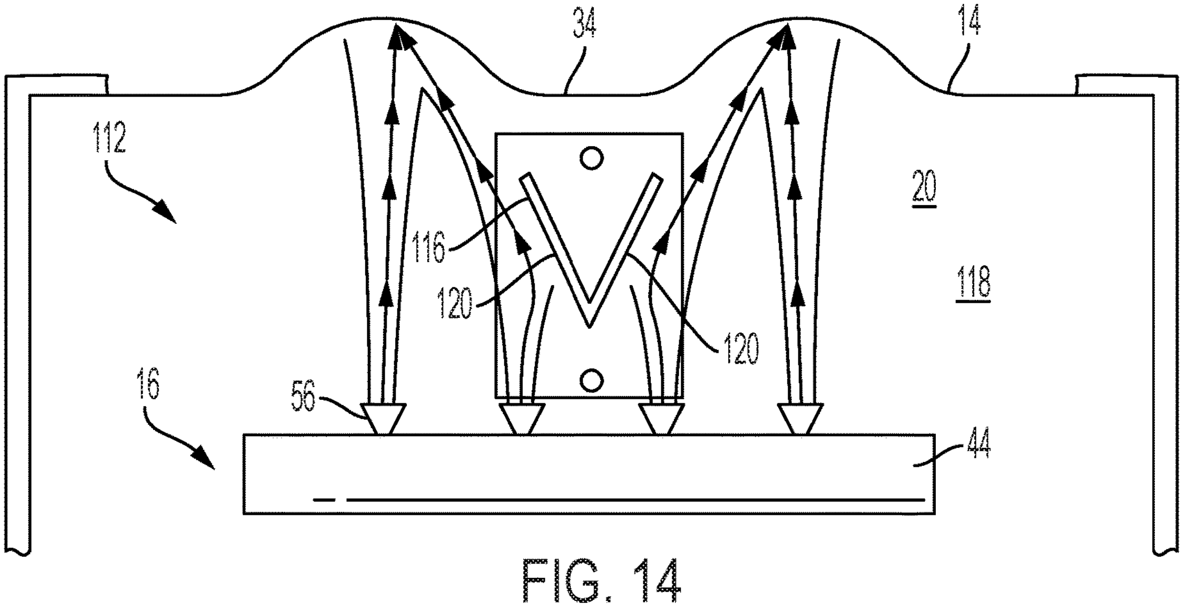
FIG. 14 is a vertical cross-sectional view of the massage apparatus shown in FIGS. 1A and 1B, showing the leg spray deflector.

Similarly, as shown in FIG. 14, the leg deflector 116 (FIG. 2) comprises a pair of deflector plates 120 affixed within the interior chamber 27 to the opposite end wall of the housing shell 20 immediately adjacent one another and extending from the end wall longitudinally of the housing centrally along the underside of the leg region 112 of the user support surface 14 and above the fluid spray assembly 16. The deflector plates 120 are thereby respectively disposed alongside the central longitudinal area of the user support surface 14 between the outward areas on which a user's legs will rest. The plates 120 abut one another along common lower plate edges and are inclined upwardly away one another in diverging relationship for deflecting outwardly toward the underside of the user support surface 14 outwardly of the plates 120 the portions of the fluid stream from the central extent of the massage head 44 which would otherwise impact the unoccupied area of the user support surface 14 between the user's legs, to thereby redirect the deflected portions of the fluid spray to impact against the legs of the user.

The operation of the body massage apparatus of the present disclosure may thus be understood. As the massage head 44 travels back-and-forth lengthwise within the chamber 27, the pressurized liquid is delivered from the pump 88 through the intervening conduits into the interior of the outer body 52 of the massage head 44 and in jet-like spray therefrom through the emission openings 56. The relative thinness of the sheet 34 together with its resilient flexibility causes the sheet 34 to conform relatively closely to the shape and contours of the user's body and, in turn, the impact of the jetted liquid against the underside of the sheet 34 is readily transmitted therethrough to the body of the user to produce a massaging effect on the user's body. As the massage head 44 reaches each opposite end of the interior chamber 25 in its traveling movement, the electric eyes or other sensors recognize the presence of the massage head 44 and, in turn, actuate reversal of the electric motor 70 to initiate driving of the massage head 44 in the opposite direction.

Figure 15:
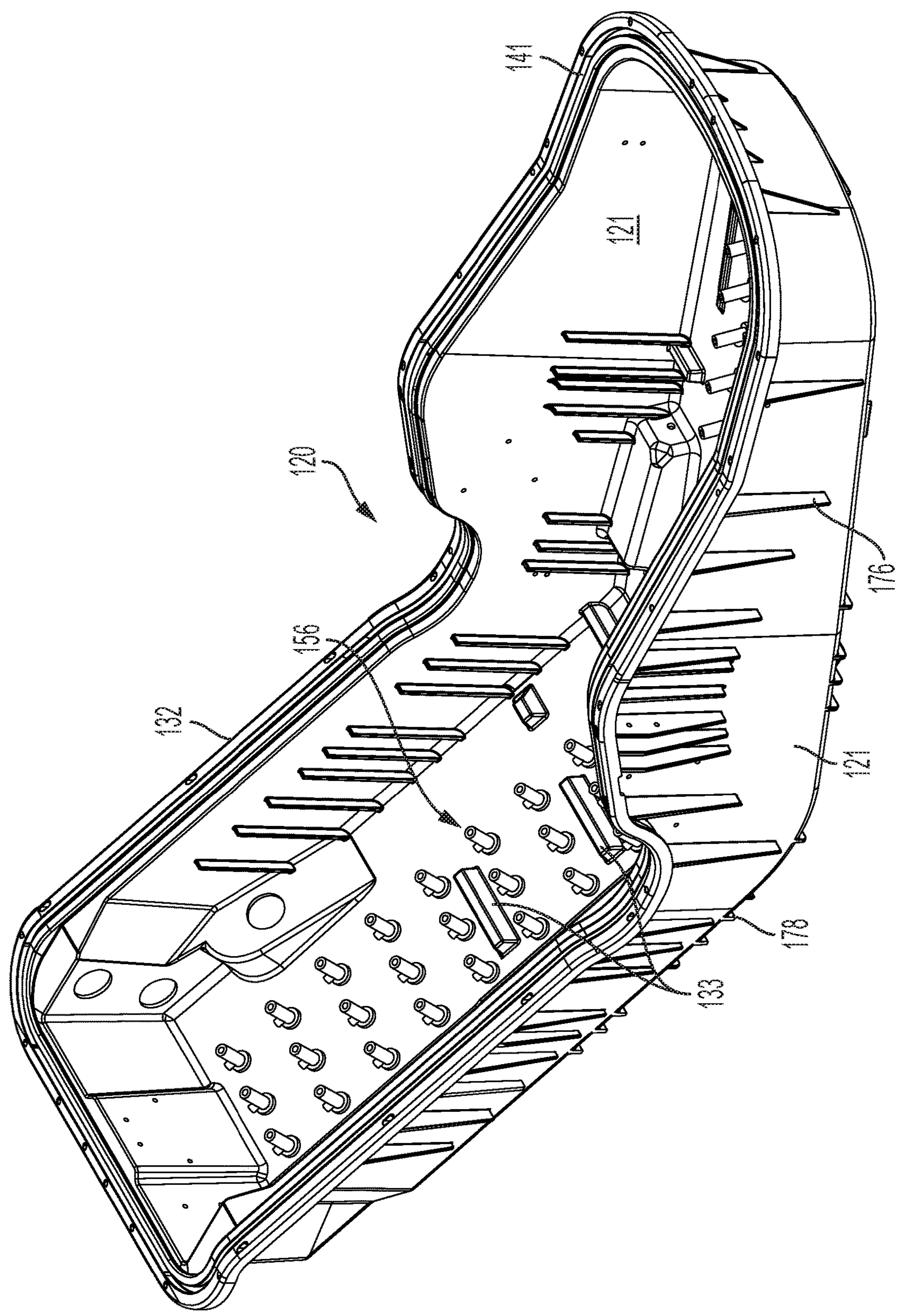
FIG. 15 is a perspective view of a housing shell of an alternate embodiment of a dry hydro-therapy massage apparatus in accordance with an alternate embodiment of the present disclosure.

Referring now to FIG. 15, a housing shell 120 in accordance with an alternate embodiment of the present disclosure is shown. The housing shell 120 differs primarily from the previously discussed embodiment, in that rather than a travelling fluid spray assembly 16 (FIG. 2), the present housing shell 120 includes a plurality of fluid nozzles 156 directed upwardly from the bottom wall 130. This design allows for the omission of various components required in the embodiment having a travelling fluid spray assembly 16. As shown, the fluid nozzles 156 are arranged in horizontal and vertical rows along the bottom wall 130. Note, however, the fluid nozzles 156 may be positioned in any desired pattern, such as, but not limited to, circular, staggered, varying spacing based on location, etc. Note also, during use the spray nozzles 156 may be operated simultaneously, in selected zones based on position of the user, independently, etc.

It will therefore be readily understood by those persons skilled in the art that the present disclosure is susceptible of a broad utility and application. Many embodiments and adaptations of the present disclosure other than those herein described, as well as many variations, modifications and equivalent arrangements, will be apparent from or reasonably suggested by the present disclosure and the foregoing description thereof, without departing from the substance or scope of the present disclosure. Accordingly, while the present disclosure has been described herein in detail in relation to its preferred embodiment, it is to be understood that this disclosure is only illustrative and exemplary of the present disclosure and is made merely for purposes of providing a full and enabling disclosure of the invention. The foregoing disclosure is not intended or to be construed to limit the present disclosure or otherwise to exclude any such other embodiments, adaptations, variations, modifications and equivalent arrangements, the present disclosure being limited only by the claims appended hereto and the equivalents thereof.

The invention claimed is:

1. An apparatus for dry hydro-therapy body massage of a user, comprising:

a housing structure having a housing shell and a user support surface for supporting the user in a reclined position, the housing shell including a bottom wall and a plurality of side walls extending upwardly therefrom, wherein the user support surface is secured to an upper perimeter of the side walls, thereby defining an interior chamber; and a vapor circulating system including a body defining an interior chamber, wherein the interior chambers of the housing structure and the vapor circulating system are in fluid communication with each other via piping, and the interior chambers of the housing structure and the vapor circulating system form a closed system that collects air from the interior chamber of the housing structure into the interior chamber of the body and subsequently returns the air from the interior chamber of the body into the interior chamber of the housing structure, wherein the interior chamber of the housing structure is configured to be partially filled with a volume of a liquid and the piping extends from a portion of the sidewall of the housing shell disposed above the volume of the liquid to the body of the vapor circulating system.

2. The apparatus of claim 1, further comprising an outlet located at a lower most portion of the body of the vapor circulating system to allow condensate collected in the body to drain back into the housing shell.

3. The apparatus of claim 1, wherein the user support surface includes a substantially-planar seat back portion, a seat portion with a semi-cylindrical main seat section and a substantially-planar leg seat section, wherein the seat back portion and the leg seat section are in relative angular relation to each other and the main seat section is disposed therebetween, and the seat back portion is adapted to support an upper body portion of the user, the leg seat section is adapted to support an upper leg extent of a lower body portion of the user, and the main seat section is adapted to support a buttocks of the user.

4. The apparatus of claim 3, further comprising a first ridge formed in the user support surface at an intersection of the main seat section and the leg seat section.

5. The apparatus of claim 3, further comprising a fluid spray assembly interiorly within the housing structure for directing a fluid stream at the user support surface for imparting a massaging effect through the user support surface to the upper body portion and lower body portion of the user.

6. The apparatus of claim 5, wherein the fluid spray assembly is movable for travel along the user support surface in a first path of travel generally along the seat back portion and a second path of travel along an acute angle relative to the first path of travel generally along the seat portion.

7. The apparatus of claim 5, wherein the fluid spray assembly comprises a plurality of fixed emission openings arranged so that a fluid flow therethrough is directed upwardly toward the user support surface.

8. The apparatus of claim 1, further comprising a liquid cooling system that blows air through an inner volume of the housing structure that is disposed between the housing shell and an outer shell in which the housing shell is disposed, wherein a cross-section of the inner volume of a center of the housing structure is less than both a cross-section of the volume at both a foot and a head of the housing structure such that the air passing through the volume undergoes a venturi effect.

9. The apparatus of claim 1, wherein the body is inflatable so as to vary a volume of the interior chamber of the body.

10. The apparatus of claim 1, wherein air from the interior chamber of the housing structure is forced into the interior chamber of the body due to a change in the volume of the interior chamber of the housing structure when supporting the user.

11. An apparatus for dry hydro-therapy body massage of a user, comprising:

a housing structure having a housing shell and a user support surface for supporting the user, the housing shell including a bottom wall and a plurality of side walls extending upwardly therefrom, wherein the user support surface is secured to an upper perimeter of the side walls, thereby defining an interior chamber;

a vapor circulating system including a body defining an interior chamber, wherein the interior chambers of the housing structure and the vapor circulating system are in fluid communication with each other via piping, and the interior chambers of the housing structure and the vapor circulating system form a closed system that collects air from the interior chamber of the housing structure forced into the interior chamber of the body due to a change in volume of the interior chamber of the housing structure when supporting the user and subsequently returns the air from the interior chamber of the body into the interior chamber of the housing structure; and a fluid spray assembly interiorly within the housing structure for directing a fluid stream at the user support surface for imparting a massaging effect through the user support surface to the upper body portion and lower body portion of the user.

12. The apparatus of claim 10, wherein the body is inflatable so as to vary a volume of the interior chamber of the body.

13. The apparatus of claim 10, wherein the housing shell defines a basin at which a volume of a liquid is contained, the piping extends from a portion of the sidewall of the housing shell disposed above the basin to the body of the vapor circulating system.

14. The apparatus of claim 12, further comprising an outlet located at a lower most portion of the body of the vapor circulating system to allow condensate collected in the body to drain back into the housing shell.

15. The apparatus of claim 10, wherein the user support surface includes a substantially-planar seat back portion, a seat portion with a semi-cylindrical main seat section and a substantially-planar leg seat section, wherein the seat back portion and the leg seat section are in relative angular relation to each other and the main seat section is disposed therebetween, and the seat back portion is adapted to support an upper body portion of the user, the leg seat section is adapted to support an upper leg extent of a lower body portion of the user, and the main seat section is adapted to support a buttocks of the user.

16. The apparatus of claim 10, further comprising a liquid cooling system that blows air through an inner volume of the housing structure that is disposed between the housing shell and an outer shell in which the housing shell is disposed, wherein a cross-section of the inner volume of a center of the housing structure is less than both a cross-section of the volume at both a foot and a head of the housing structure such that the air passing through the volume undergoes a venturi effect.

17. An apparatus for dry hydro-therapy body massage of a user, comprising:

a housing structure having a housing shell and a user support surface for supporting the user, the housing shell including a bottom wall and a plurality of side walls extending upwardly therefrom, wherein the user support surface is secured to an upper perimeter of the side walls, thereby defining an interior chamber;

a vapor circulating system including a body defining an interior chamber, wherein the interior chambers of the housing structure and the vapor circulating system are in fluid communication with each other via piping, the housing shell defining a basin at which a volume of a liquid is contained, the piping extends from a portion of the sidewall of the housing shell disposed above the basin to the body of the vapor circulating system;

the interior chambers of the housing structure and the vapor circulating system form a closed system that collects air from the interior chamber of the housing structure forced into the interior chamber of the body due to a change in volume of the interior chamber of the housing structure when supporting the user and subsequently returns the air from the interior chamber of the body into the interior chamber of the housing structure; and an outlet located at a lower most portion of the body of the vapor circulating system to allow condensate collected in the body to drain back into the housing shell.

18. The apparatus of claim 17, wherein the body is inflatable so as to vary a volume of the interior chamber of the body.

19. The apparatus of claim 18, further comprising a fluid spray assembly interiorly within the housing structure for directing a fluid stream at the user support surface for imparting a massaging effect through the user support surface to the upper body portion and lower body portion of the user.

20. The apparatus of claim 17, wherein the housing structure is configured such that the user support surface supports the user in a reclined position.

* * * * *